（12） United States Patent
Jalloul et al.

(10) Patent No.: US 7,489,942 B2
(45) Date of Patent: Feb. 10, 2009

(54) METHOD AND APPARATUS FOR SOFT HANDOFF COMMUNICATIONS IN A COMMUNICATION SYSTEM OPERATING ACCORDING TO IS-95B AND IS-95C STANDARDS

(75) Inventors: Louay Jalloul, Palatine, IL (US); Keith A. Tenbrook, Cary, IL (US); Yuda Yehuda Luz, Buffalo Grove, IL (US); Jiangnan (Jason) Chen, Darien, IL (US); Ron Rotstein, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 488 days.

(21) Appl. No.: 10/772,030

(22) Filed: Feb. 4, 2004

(65) Prior Publication Data
US 2004/0157609 A1  Aug. 12, 2004

Related U.S. Application Data

(62) Division of application No. 09/545,125, filed on Apr. 7, 2000, now Pat. No. 6,768,908.

(51) Int. Cl.
*H04B 7/00* (2006.01)
*H04M 1/00* (2006.01)
*H04Q 7/20* (2006.01)
(52) U.S. Cl. .............. 455/522; 455/67.11; 455/442; 455/552.1
(58) Field of Classification Search ............ 455/562.1, 455/560, 561, 552.1, 436, 442, 439, 437, 455/553.1, 67.11; 370/320, 335, 332; 375/148
See application file for complete search history.

(56) References Cited

U.S. PATENT DOCUMENTS

| 5,345,448 | A |   | 9/1994  | Keskitalo |
| 5,548,808 | A |   | 8/1996  | Bruckert et al. |
| 5,737,703 | A |   | 4/1998  | Byrne |
| 5,937,019 | A | * | 8/1999  | Padovani ............ 375/358 |
| 5,978,679 | A | * | 11/1999 | Agre ................ 455/442 |
| 6,021,328 | A |   | 2/2000  | Curtis et al. |

(Continued)

FOREIGN PATENT DOCUMENTS

EP    0719064 A    6/1996

(Continued)

*Primary Examiner*—Tilahun B Gesesse

(57) ABSTRACT

A method and apparatus provide for soft handoff operation of at least a first signal transmitted according to a first communication standard (IS-95B) and a second signal transmitted according to a second communication standard (IS-95C). A mobile station (104) initially receives the first signal, detects presence of a pilot signal, measures pilot signal strength, transmits a pilot strength measurement message, fails to receive a handoff direction message after transmitting the pilot strength measurement message, searches for detecting presence of a broadcast control channel associated with the type IS-95C cell sites, measures a carrier to interference ratio of the broadcast control channel, compares the carrier to interference ratio to a threshold, if the carrier to interference ratio is above the threshold, initiates a second communication according to IS-95C standard, thus, allowing initiating a soft handoff operation by allowing the base sites to transmit information according to the IS-95B and IS-95C standards respectively via the first and second signals. MS 104 combines the first and second signals to take advantage of the soft hand-off operation.

2 Claims, 4 Drawing Sheets

U.S. PATENT DOCUMENTS

| | | | |
|---|---|---|---|
| 6,125,137 A * | 9/2000 | Wang et al. | 375/148 |
| 6,195,552 B1 * | 2/2001 | Jeong et al. | 455/436 |
| 6,233,455 B1 | 5/2001 | Ramakrishna et al. | |
| 6,301,234 B1 | 10/2001 | Lee | |
| 6,307,849 B1 | 10/2001 | Tiedemann, Jr. | |
| 6,351,460 B1 | 2/2002 | Tiedemann, Jr. et al. | |
| 6,353,602 B1 * | 3/2002 | Cheng et al. | 370/332 |
| 6,356,528 B1 * | 3/2002 | Lundby et al. | 370/209 |
| 6,430,414 B1 * | 8/2002 | Sorokine et al. | 455/442 |
| 6,459,693 B1 * | 10/2002 | Park et al. | 370/342 |
| 6,567,666 B2 * | 5/2003 | Czaja et al. | 455/442 |
| 6,574,473 B2 | 6/2003 | Rinne et al. | |
| 6,584,087 B1 | 6/2003 | Czaja et al. | |
| 6,625,132 B1 * | 9/2003 | Boettger et al. | 370/329 |
| 6,728,304 B2 * | 4/2004 | Brown et al. | 375/148 |
| 6,934,319 B2 * | 8/2005 | Subramanian | 375/142 |
| 7,177,265 B1 * | 2/2007 | Schaffner | 370/208 |
| 2002/0154682 A1 * | 10/2002 | Chen et al. | 375/148 |

FOREIGN PATENT DOCUMENTS

| | | |
|---|---|---|
| WO | 9927747 A | 6/1999 |
| WO | WO 98/50909 | 11/1999 |

\* cited by examiner

METHOD AND APPARATUS FOR SOFT HANDOFF COMMUNICATIONS IN A COMMUNICATION SYSTEM OPERATING ACCORDING TO IS-95B AND IS-95C STANDARDS

CROSS-REFERENCE to RELATED APPLICATION

This application is a divisional of U.S. application Ser. No. 09/545,125, filed Apr. 7, 2000 now U.S. Pat. No. 6,768,908, and priority thereto is hereby claimed.

BACKGROUND OF THE INVENTION

The invention relates to the field of communications and communication systems, and more particularly, to a code division multiple access (CDMA) communication system.

Several types of commercially available CDMA communication systems operate according to communication standards commonly known as IS-95B and IS-95C standards. Such systems evolve from one generation to another. For example, the IS-95B standard followed a previously known IS-95A standard to provide additional capacity while improving performance in many different aspects of the CDMA communication systems. Recently the IS-95C standard, otherwise known as IS2000, has been introduced to meet even a higher demand for capacity and performance. The standards describing the details of IS-95A, IS-95B, IS-95C (IS2000) systems, a copy of each may be obtained by contacting Telecommunications Industry Association in Washington D.C., USA, or visiting the world wide web site at www.tiaonline.org, incorporated by reference herein.

Referring to FIG. 1, a simplified block diagram of a communication system 100 with several cell sites coverage areas and certain associated building blocks is shown. Often times CDMA systems operating according to different standards are implemented in coverage areas located side by side, in proximity of each other or in an overlapping coverage area. For example, a cell site 101 having multiple sectors provides communication services according to IS-95B and IS95-C standards in an overlapping coverage area. Cell site 101 achieves multi-type services by coupling a base transceiver station (BTS) 131 of type IS-95B and BTS 132 of type IS-95C to a base station controller (BSC) 134. Since BSC 134 controls some aspects of the communication calls made via cell site 101, BSC 101 may decides which type of service, type B for IS-95B or type C for IS-95C, a mobile user may receive while it is in the coverage area. The mobile user may also select the service type. BSC 134 provides the communication services through the selected communication type by routing the information through the corresponding BTS, for example, either BTS 131 or BTS 132 if the mobile station is in the cell site 101 coverage area.

According to one example of a cell configuration as shown in communication system 100, a cell site 103 adjacent to cell site 101 may provide only communication services according to IS-95B standards. As such, a BTS 135 serving cell site 103 is of the B type and coupled to BSC 134. A cell site 102 adjacent to cell sites 103 and 101 may provide communication services according to IS-95C standards. As such a BTS 136 serving cell site 102 is of the C type and coupled to BSC 134. Other cell site configurations are also possible.

Since mobile stations are also evolving with the standards, a mobile station may operate in a single-mode or dual-mode or other multi-mode. In case of dual-mode operation, the mobile station may operate according to both IS-95B and IS-95C standards. A mobile station (MS) 104, if it is in a single-mode operation, may receive communication services from cell sites 101 and 102 through BTSs 132 and 136 or cell sites 101 and 103 through BTSs 131 and 135 depending on whether its mode of operation is IS-95C or IS-95B respectively. A dual-mode MS 104, however, may not be able to efficiently receive communication services from all three cell sites 101-03. At least to some extent, MS 104 in dual mode operation may not benefit from soft hand operation from all three cell sites.

The operation known as soft handoff commonly known to one ordinary skilled in the art allows a mobile station to receive and combine from neighboring base stations different signals to improve receiving quality. The received signals are combined in the receiver to gain improvement in reception and decoding of the transmitted information. The operations relating to the soft handoff are well known to one ordinary skilled in the art in view of the description provided in the IS-95B and IS-95C standards.

When a mobile station receives signals communicated according to a common standard, the soft-combining operation is easily performed. For example, if mobile station 104 is communicating with cell site 101 according to IS-95B standard through BTS 131 and moves to cell site 103, the soft handoff operation is easily performed because cell site 103 operates through BTS 135 which is of the B type. As such, BSC 134 may easily transmit the information to MS 104 via cell sites 101 and 103 through BTSs 131 and 135 which both are of the B type. However, if mobile station 104 is communicating with cell site 101 according to IS-95B standard and moves to cell site 102, the soft handoff operation may not be possible because cell site 102 provides only communication services through BTS 136 operating according to IS-95C standard. Moreover, when MS 104 is communicating with cell site 101 through BTS 131 operating according to IS-95B standard, soft handoff operation for signals transmitted from cell site 101 through BTS 132 operating according to IS-95C standard may not be possible or difficult. It is well understood by one ordinary skilled in the art that the terms cell site and sector are interchangeable in the way the communication services are provided.

Therefore, there is a need for a method and apparatus that facilitates soft-combining operation of received signals transmitted according to different CDMA standards.

DETAILED DESCRIPTION OF THE PREFERRED EMBODIMENT(S)

Figure 1:
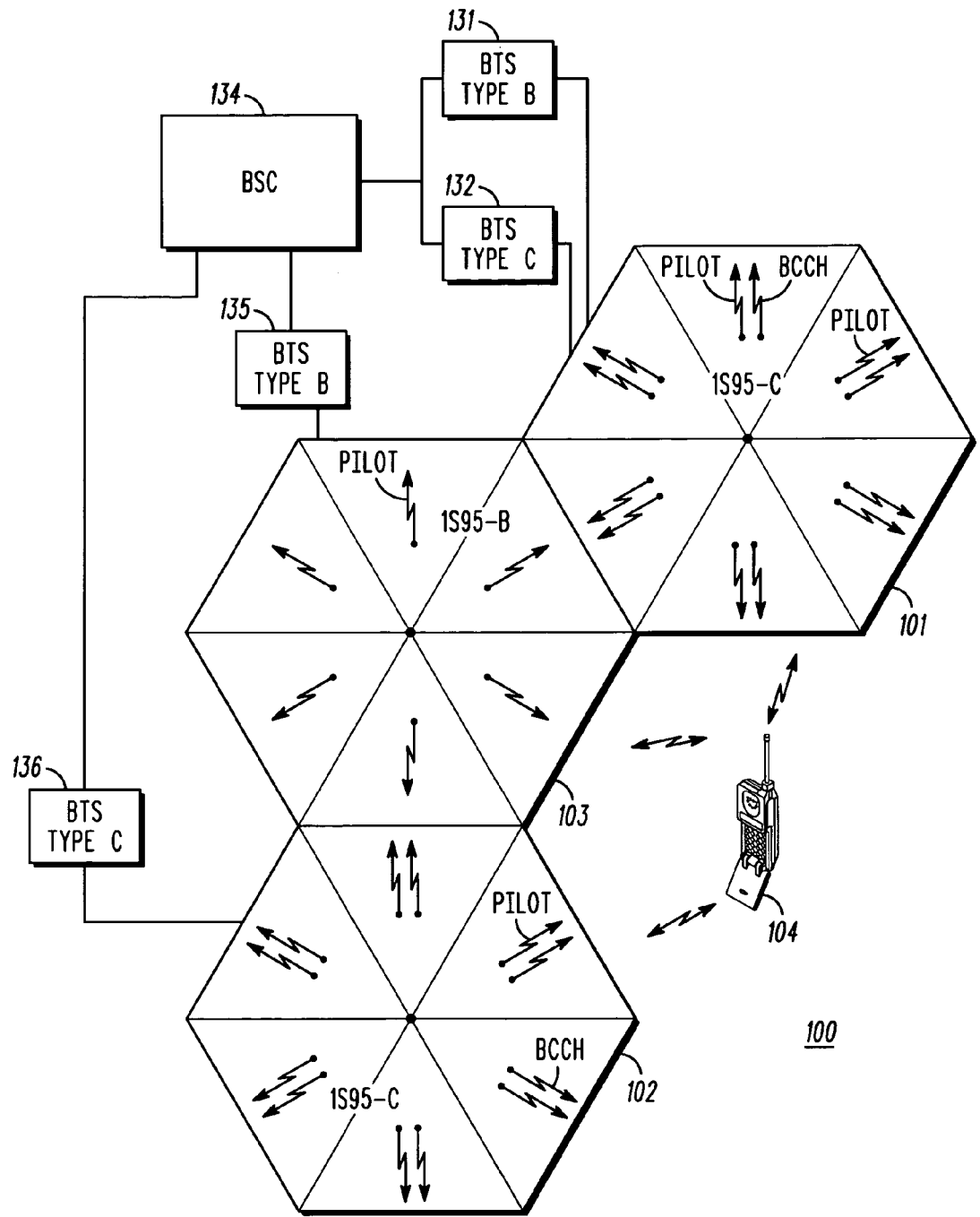
FIG. 1 depicts a simplified block diagram of a communication system with several cell sites coverage areas and certain associated building blocks.

A communication system operating according to IS-95C standard includes a broadcast common control channel (BCCH). A mobile station operating in dual mode can detect presence of a BCCH. A mobile station capable of operating in dual-mode may substantially benefit from various aspects of the invention which allows soft combining of signals transmitted according to at least two different types of communication standards such IS-95B and IS-95C from different cell sites or sectors.

In communication system 100, a method and apparatus provide for soft handoff operation of at least a first signal transmitted according to a first communication standard (IS-95B) and a second signal transmitted according to a second communication standard (IS-95C). A mobile station and a cell site on an initial contact may select the first communication standard. The mobile station, such as mobile station 104, initially receives the first signal while in a communication link with communication system 100. Such a communication link may be, for example, with cell site 103 that provides communication services according to IS-95B standard. Each sector of a cell site, or a cell site, transmits a pilot signal encoded with a pseudo random code having a unique time offset, commonly known as PN offset. Mobile station (MS) 104 may detect presence of a pilot signal, possibly a new pilot signal other than the one that has already been detected. As a normal part of routine operation performed by MS 104 for maintaining an adequate communication link, MS 104 measures pilot signal strength of the pilot signal. Based on the pilot signal strength and, possibly, other information, MS 104 may find a more appropriate cell site or sector for hand-off of the communication link. MS 104 transmits a pilot strength measurement message based on the measured pilot signal strength by using a communication channel communicated according to the first communication standard. If the pilot signal was transmitted from a cell site of only type C, such as cell site 102, cell site 103, which is of the B type, will not respond to the message. Such a response normally is generated from BSC 134. Since BSC 134 has no knowledge of MS 104 capability with respect to the dual-mode operation, BSC 134 would not respond to the message. As a result, MS 104, after a short period of time, fails to receive a handoff direction message after transmitting the pilot strength measurement message. Failing to receive a handoff direction message may be an indication that the pilot signal was transmitted from a cell site of type C. MS 104 searches for detecting presence of a broadcast control channel that is associated with type C cell sites. If a broadcast control channel is detected, MS 104 measures a carrier to interference ratio of the broadcast control channel. Furthermore, MS 104 compares the carrier to interference ratio to a threshold. MS 104 initiates, if the carrier to interference ratio is above the threshold, a second communication according to the second communication standard using a reverse link common control channel communicated according to the second communication standard. MS 104 transmits the pilot strength measurement message using the reverse link common control channel. At this point, MS 104 has communication links according to both IS-95B and IS-95C in the communication system 100. BSC 134, thus, allows initiating a soft handoff operation by transmitting information according to the first and second communication standards respectively via the first and second signals. MS 104 combines the first and second signals to take advantage of the soft hand-off operation.

In case mobile station 104 is detecting a pilot signal from cell site 101, the pilot strength measurement message would be responded to by BSC 134 because cell site 101 is capable of providing communication services for both B and C types, the first and second communication standards. Therefore, BSC 134 generates a hand off direction message based on the message for directing a hand-off operation. It is preferable to move communication services to the C type because it provides better performance than the B type in some instances. Additionally, in this situation, MS 104 may detect presence of a broadcast channel transmitted from cell site 101. MS 104 measures a carrier to interference ratio of the broadcast control channel, and compares the carrier to interference ratio to a threshold. MS 104 then initiates, if the carrier to interference ratio is above the threshold, a second communication according to the second communication standard, type C, using a reverse link common control channel. MS 104 transmits the pilot strength measurement message using the reverse link common control channel. BSC 134, then, initiates a soft handoff operation by transmitting information according to the first and second communication standards respectively via said first and second signals. MS 104 then combines the first and second signals. At this point, MS 104 may drop the first signal communicated according to the first communication standard, B type, and continue the communication through the second communication standards. As such, MS 104 moves from a B type communication service, to a C type communication service where it is available.

Figure 2:
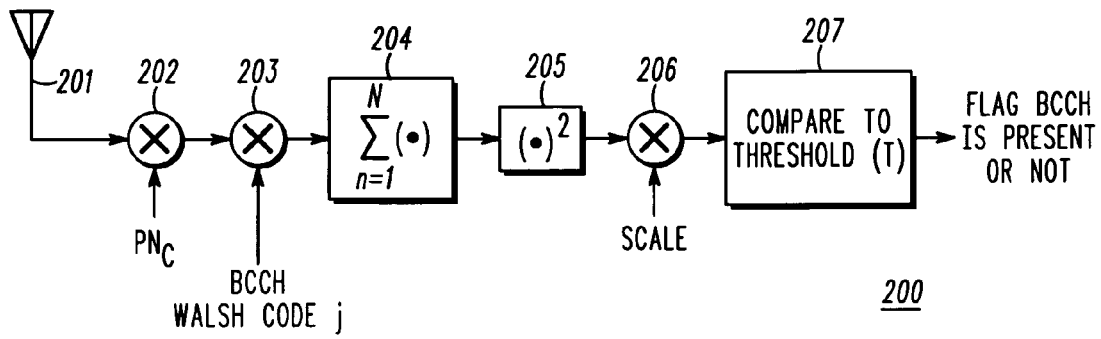
FIG. 2 depicts a communication receiver for detecting presence of BCCH channel.

Referring to FIG. 2, a communication receiver 200 is shown. Receiver 200 may be used for detecting presence of BCCH channel. Receiver 200 may include a receiving antenna 201 for receiving, among other signals, the second signal and the BCCH signal. The BCCH signal is fed to a de-spreader 202 for de-spreading the signal according to a PN sequence assigned to a C type communication. A resulting signal is fed to a de-spreader 203 for de-spreading function according to a Walsh Code assigned to the BCCH. A resulting signal energy is determined collectively through a summing block 204 and a squaring block 205. If there is any need for scaling the resulting metric energy, a scaling block 206 scales the matrices before being fed to a comparator 207. Comparator 207 compares the energy to a threshold to determine whether a BCCH channel is present. A BCCH channel flag may be produced indicating presence of a BCCH channel.

The threshold may be determined according to a known method. Preferably, the threshold may be determined based on a part or the total amount of transmit power allocate to the pilot signal transmitted from that cell site, a part or total amount of transmit power allocated to the BCCH and a threshold used in the soft hand-off operation in the cell site. The hand-off threshold is well known by one ordinary skilled in the art in view of the IS-95B and IS-95C standards.

Figure 3:
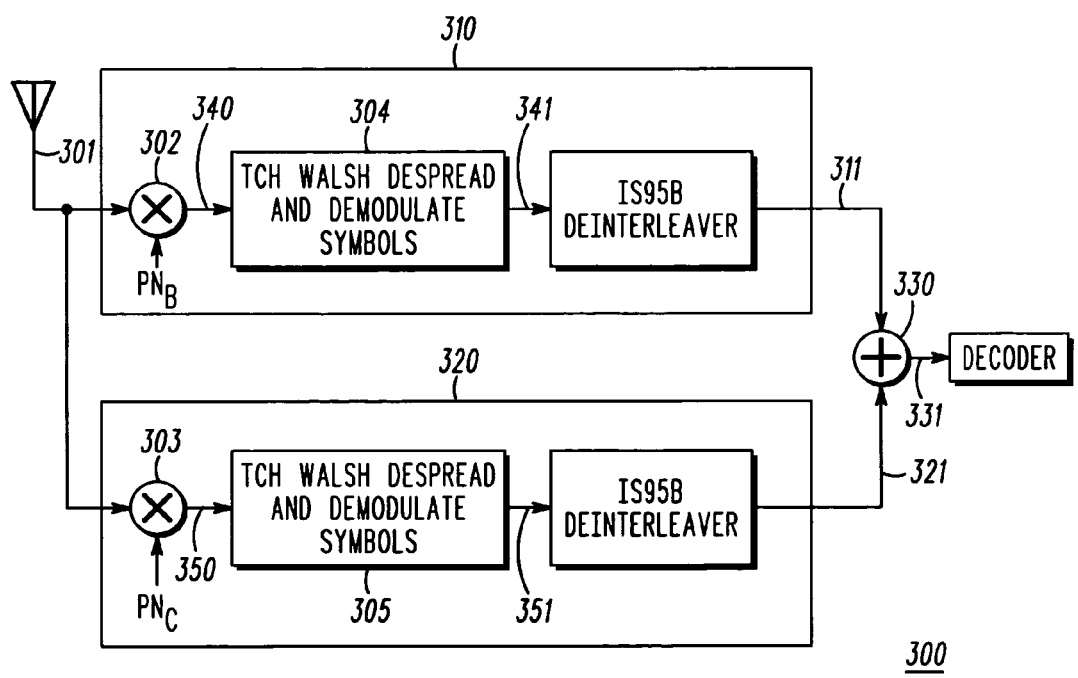
FIG. 3 depicts a simplified block diagram of a receiver for receiving, combining and decoding the first and second signals communicated according to respectively the first and second communication standards.

Referring to FIG. 3, a simplified block diagram 300 of a receiver is shown for receiving, combining and decoding the first and second signals communicated according to respectively the first and second communication standards. An antenna 301 receives both the first and second signals. Receiver 300 in a communication system includes a first signal processing block 310 for processing the first received signal according to the first communication standard to produce a first received processed signal 311. Receiver 300 further includes a second signal processing block 320 for processing the second received signal according to the second communication standard to produce a second received processed signal 321. Signals 311 and 321 are combined in a combiner 330 to produce a combined signal 331. The first communication standard may be IS-95B standard, and the second may be IS-95C standard.

Receiver 300 further includes a decoder for decoding combined signal 331 to retrieve information communicated via the first and second signals.

First processing block 310 may include a despreader 302 despreading the first signal by multiplying the first signal with a first PN sequence compatible to the first communication standard (IS-95B) to produce a first despread signal 340. A traffic channel Walsh code despreader/demodulator 304 despreads and demodulates signal 340 to produce a first demodulated signal 341. A deinterleaver deinterleaves first demodulated signal 341 according to a first interleaving/deinterleaving function of the first communication standard to produce first received processed signal 311.

Second processing block 320 may include a despreader 303 despreading the second signal by multiplying the second signal with a second PN sequence compatible to the second communication standard to produce a second despread signal 350. A traffic channel Walsh code despreader/demodulator 305 despreads and demodulates signal 350 to produce a second demodulated signal 351. A deinterleaver deinterleaves second demodulated signal 351 according to a second interleaving/deinterleaving function of the second communication standard to produce second received processed signal 321.

Figure 4:
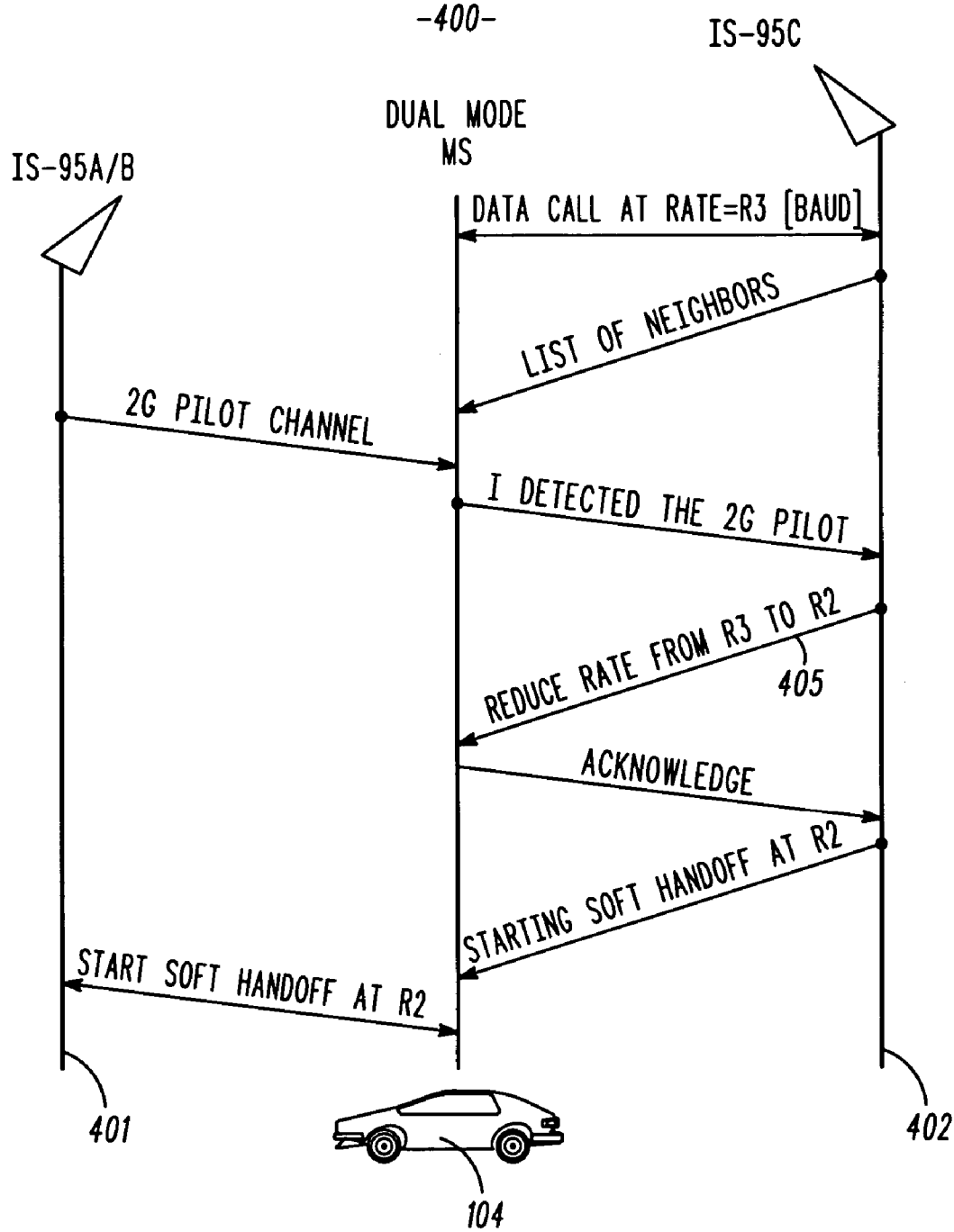
FIGS. 4 and 5 depict one or more example of messaging systems between a mobile station and cell sites of type IS-95B and C respectively.
Figure 5:
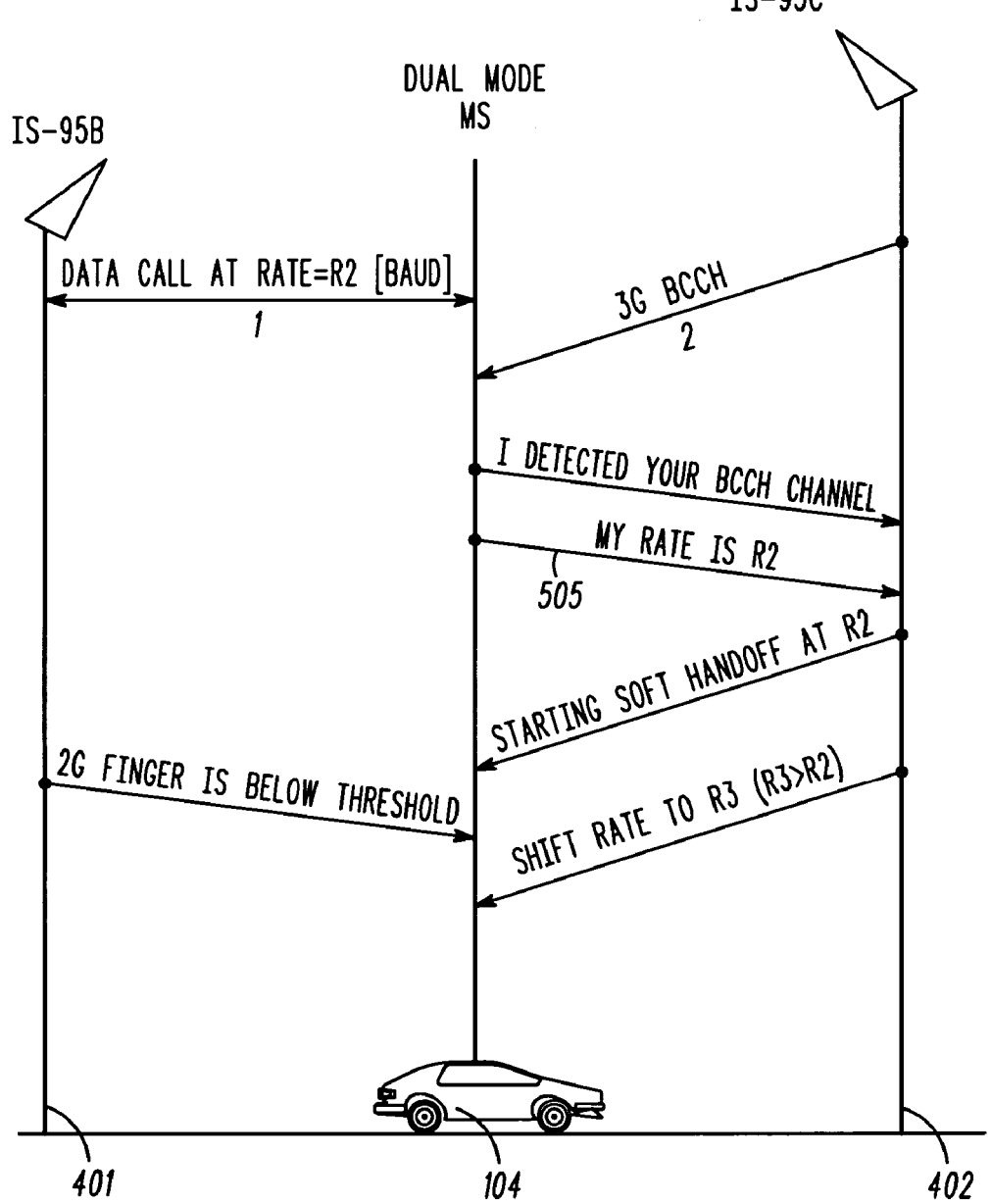

Communication data rates allowed and provided by a cell site operating according to the first communication standard may be different than the allowed data rates in the second communication standard. As such, in order to make the soft combining operation in a preferred method, the invention may include equalizing communication data rates of the first and second signals communicated according to the first and second communication standards respectively. This step may be accomplished by a messaging system communicated between MS 104 and BSC 134 through corresponding BTS units. Equalizing communication data rate may include communicating data rate of the first signal to a source of the second signal for setting data rate of the second signal equal to data rate of the first signal. Equalizing communication data rate may include adjusting data rate of the second signal to data rate of the first signal. One or more example of such messaging system 400 and 500 are shown in FIGS. 4 and 5 between a MS 104 and cell sites 401 and 402 of type IS-95B and C respectively. Since the available data rates in IS-95C may be higher than the available data rates in IS-95B, messaging system 400 includes at least a step 405 for reducing the data rate. Messaging system 500 may include a step 505 which simply informs the other system of its data rate.

What is claimed is:

1. An apparatus for detecting a broadcast control channel energy in a multi-generational mobile station comprising:
   a pseudo-noise despreader for despreading a received broadcast control channel signal according to a known base station pseudo-noise sequence;
   a broadcast control channel Walsh Code despreader for despreading the received signal according to a known Walsh Code for the broadcast control channel;
   a signal energy calculator for calculating a signal energy of the signal despread by the pseudo-noise despreader and the Walsh Code despreader;
   a multiplier for scaling the calculated signal energy according to a preset scaling factor; and
   a comparator for comparing the scaled signal energy to a threshold.

2. The apparatus of claim 1 further comprising a means for determining whether the broadcast control channel is present based on the comparison of the scaled signal energy to the threshold.

* * * * *